UNITED STATES PATENT OFFICE.

PETER H. STEENBERGEN, OF CHICO, CALIFORNIA.

IMPROVEMENT IN MEDICAL COMPOUNDS OR PILES LINIMENTS.

Specification forming part of Letters Patent No. 141,961, dated August 19, 1873; application filed April 22, 1873.

*To all whom it may concern:*

Be it known that I, PETER H. STEENBERGEN, of Chico, Butte county, State of California, have invented an Improved Liniment for the Cure of Piles; and I do hereby declare that the following specification is a true and correct statement of my invention, setting forth the names of the ingredients and the proportions of each used, together with directions for making and using the same.

To make my liniment I employ the following ingredients: ten (10) pounds green Jamestown leaves; six (6) pounds night-shade, leaves and all; two (2) pounds alder-bark. Put all together in a kettle and cover with water, and boil over a slow fire three days, after which I press out the juice. I then strain the juice and boil the same, adding one gallon of rusty-bacon grease, one quart of sweet-oil, one pound of flour of sulphur. The whole is then boiled over a slow fire until all the water has evaporated, the mass being frequently stirred to keep the sediment from settling to the bottom.

Directions for use: Use external entirely. Wash the parts well once each day with Castile soap; anoint with the liniment three times each day; and, in case the bowels act, wash immediately and anoint again; and so continue until a cure is effected.

Having thus described my invention, what I claim, and desire to secure by Letters Patent, is—

An ointment for the cure of piles composed of the ingredients above enumerated, in about the proportions specified.

In witness whereof I hereunto set my hand and seal.

PETER H. STEENBERGEN. [L. S.]

Witnesses:
J. A. CLARKE,
A. L. HILL.